US008265686B2

(12) United States Patent
Klassen et al.

(10) Patent No.: US 8,265,686 B2
(45) Date of Patent: Sep. 11, 2012

(54) SYSTEM AND METHOD FOR SHARING IMAGES USING AN UPLOAD MENU

(75) Inventors: Gerhard D. Klassen, Waterloo (CA); Terrill Dent, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 789 days.

(21) Appl. No.: 11/754,749

(22) Filed: May 29, 2007

(65) Prior Publication Data
US 2008/0299997 A1    Dec. 4, 2008

(51) Int. Cl.
*H04M 1/00* (2006.01)
(52) U.S. Cl. ........ 455/550.1; 455/566; 455/466
(58) Field of Classification Search ........ 455/550.1, 455/566, 466
See application file for complete search history.

(56) References Cited

U.S. PATENT DOCUMENTS

| 7,650,069 B1* | 1/2010 | Davoust et al. ........ 396/429 |
| 2003/0030731 A1* | 2/2003 | Colby ........ 348/231.3 |
| 2004/0021781 A1* | 2/2004 | Iida ........ 348/231.3 |
| 2004/0174443 A1* | 9/2004 | Simske ........ 348/231.3 |
| 2006/0052091 A1* | 3/2006 | Onyon et al. ........ 455/415 |
| 2006/0189349 A1 | 8/2006 | Montulli et al. |
| 2008/0178073 A1* | 7/2008 | Gao et al. ........ 715/243 |
| 2008/0189293 A1* | 8/2008 | Strandel et al. ........ 707/10 |
| 2008/0215964 A1* | 9/2008 | Abrams et al. ........ 715/246 |
| 2009/0046158 A1* | 2/2009 | Nitta et al. ........ 348/207.2 |

FOREIGN PATENT DOCUMENTS
KR   10-2006-0045177    5/2006
KR     20060045177  A  5/2006

OTHER PUBLICATIONS

Chinese Office Action dated Dec. 31, 2010.

* cited by examiner

*Primary Examiner* — Kamran Afshar
*Assistant Examiner* — Dung Lam
(74) *Attorney, Agent, or Firm* — Rowand Intellectual Property Law

(57) ABSTRACT

There is disclosed a system and method for uploading an image file to an image repository from a mobile handheld communications device having an integrated camera. In an embodiment, the method comprises: upon determining capture of an image using the integrated camera, automatically initiating an image upload module; configuring the image upload module to display an image upload user interface having user selectable image upload settings; and upon receiving user instructions, uploading the image file to the image repository with the selected image upload settings. The upload settings may be preselected and the device may be preauthorized to access an account on the image repository.

20 Claims, 10 Drawing Sheets

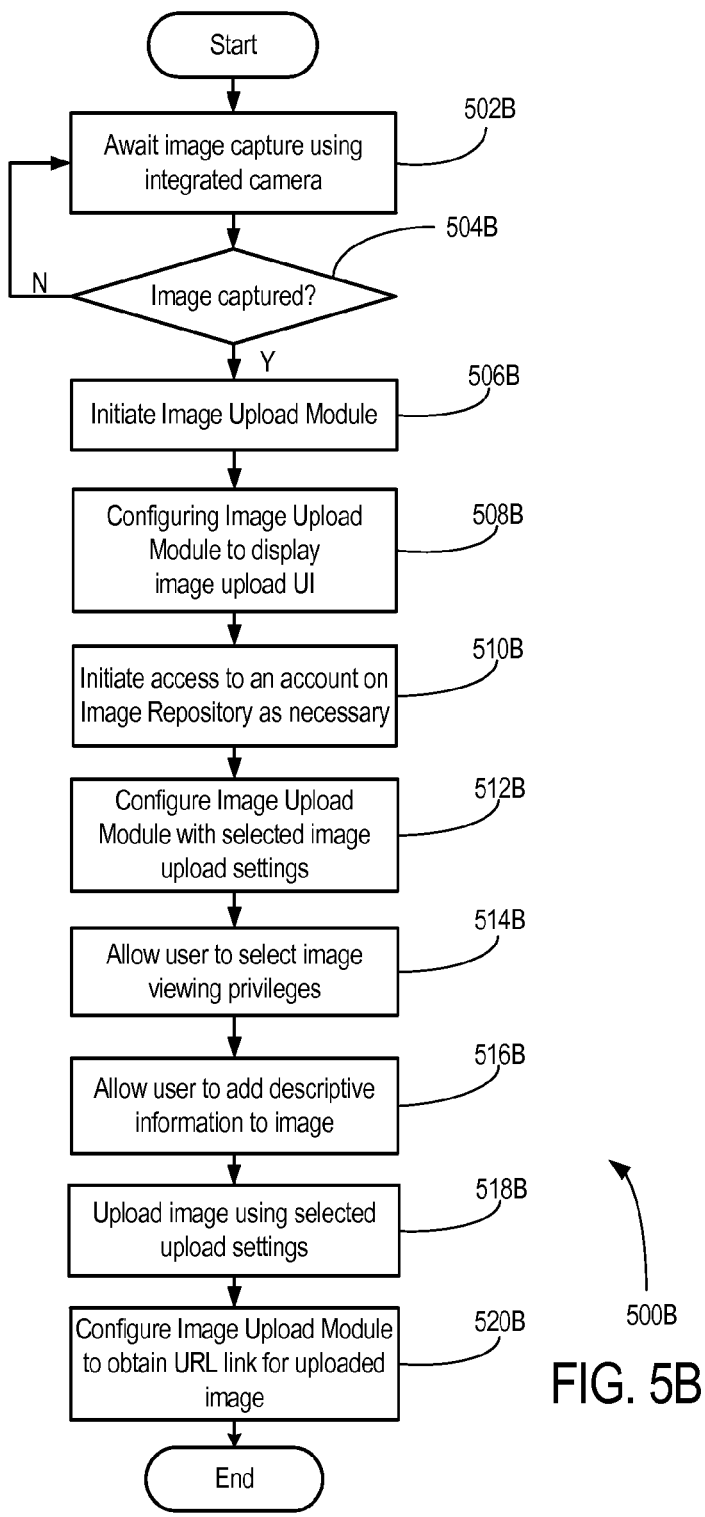

SYSTEM AND METHOD FOR SHARING IMAGES USING AN UPLOAD MENU

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates generally to systems and methods for sharing images using an image upload module.

BACKGROUND

Recent advances with handheld wireless communication devices have resulted in the introduction of integrated cameras capable of capturing images at a resolution sufficient for many consumer applications. Once captured, the images may be stored in available memory on the communication device, and viewed on a display provided on the communication device. However, the available memory on the communication device may be limited, and a user may not be able to capture and store new images in the communication device without deleting images or other files already stored in memory. As well, while the user may enjoy the images on the communication device, the user may want to share the images with other users. However, there may be carrier network restrictions on transmission bandwidth. Also, if the images are to be shared, the ability to easily add descriptive information and location information about the images may be desirable.

What is needed is an improved system and method for uploading images.

BRIEF DESCRIPTION OF THE DRAWINGS

In the figures which illustrate exemplary embodiments:

FIG. 5B is a flowchart of an illustrative method for sharing images using an image upload module in accordance with an embodiment.

DETAILED DESCRIPTION

As noted above, the present invention relates generally to systems and methods for sharing images using an upload menu.

Figure 1:
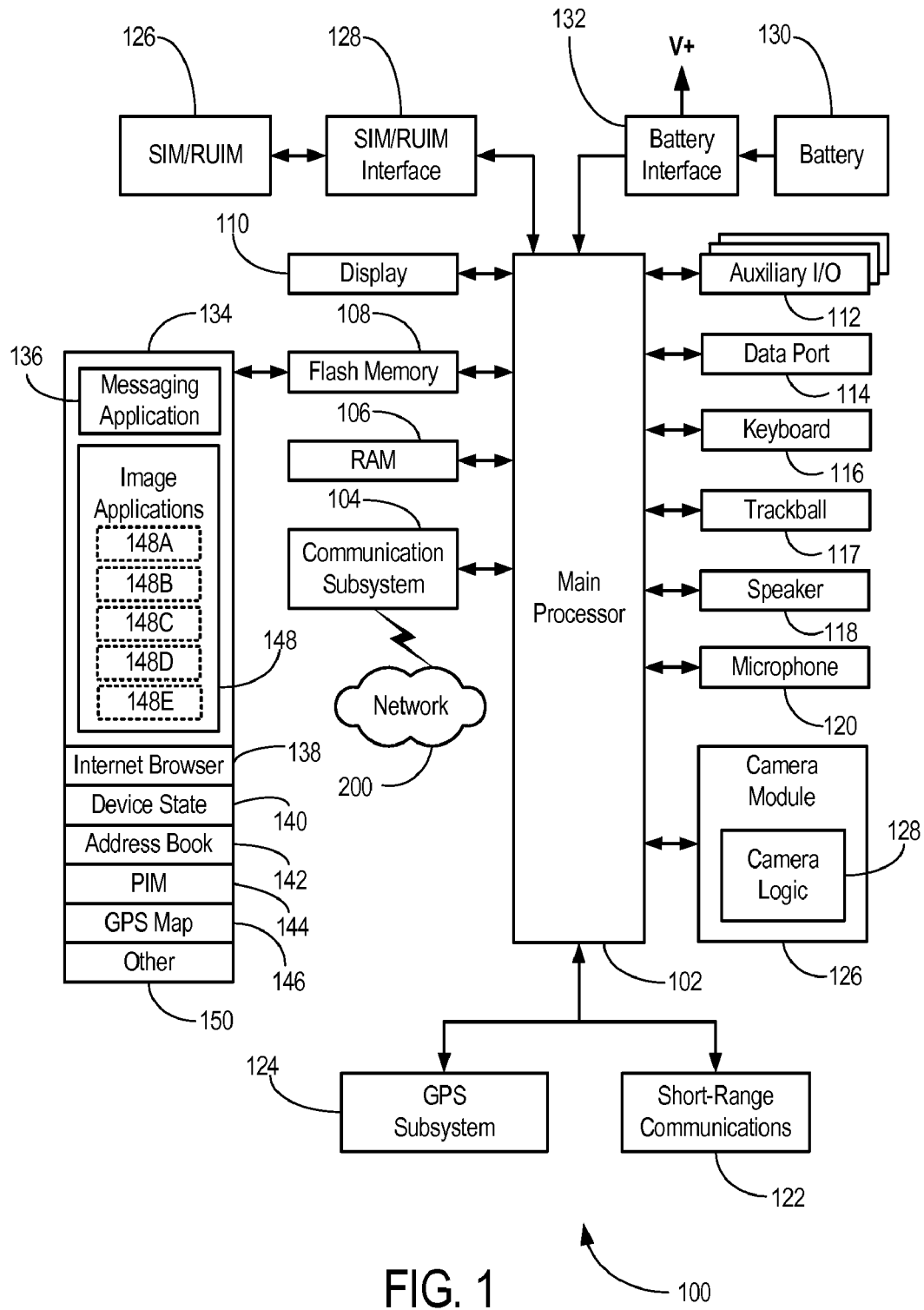
FIG. 1 is a schematic block diagram of various components that may be found in a handheld mobile communication device.

In an illustrative embodiment, the invention may be practiced with a handheld mobile communication device in a wireless operating environment. Shown in FIG. 1 is a schematic block diagram of an illustrative handheld mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, a GPS subsystem 124, a camera module 126, and associated camera logic 128.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

The GPS subsystem 124 may include a GPS antenna to receive signals transmitted by a minimum number of in-view GPS satellites required to acquire accurate latitude and longitude coordinates. The GPS system may also be operatively connected to the main processor 102 to pass the acquired latitude and longitude coordinates to one or more software applications 134, and to store the latitude and longitude coordinates as may be required into flash memory 108 or RAM 106. If the GPS antenna is not able to receive a signal from a sufficient number of in-view GPS satellites (e.g. because of buildings, bridges, or other obstructions, or because the communication device 100 is being used indoors), it may not be possible to acquire the GPS coordinates.

The camera module 126 may be adapted to capture an image through a lens onto a light sensitive image sensor such as a charge coupled device (CCD) sensor array or a complementary metal oxide semiconductor (CMOS) sensor array. The camera lens may be a fixed focus lens, or a variable focus lens with or without zoom features and controlled by camera logic 128 to focus an image onto the CCD or CMOS sensor array. The size and pixel density of the CCD or CMOS sensor array may be suitably selected for the image resolution required for a particular application. Camera logic 128 may also control the camera lens aperture and/or shutter speed by incorporating a suitable light exposure meter. Image capture using camera module 126 may initiated by a user controlling a dedicated camera shutter, or a context dependent programmable button or key (on keyboard 116, for example) that may act as a camera shutter button.

Once captured by the CCD or CMOS sensor array, the image may then be processed by camera logic 128 into a suitable digital image file format such as Joint Photographic Experts Group (JPEG), Tagged-Image File Format (TIFF), Bit Mapping (BMP), different variations on these standard image file formats, or a vendor proprietary RAW image format. The image file format may allow for the addition of image meta-data to an image file in an industry standards exchangeable image file format (EXIF), or in some vendor proprietary meta-data format.

The image file may then be stored in available device storage such as RAM 106 or flash memory 108, and displayed on display 110. As will be described in detail further below, in order to minimize consumption of potentially scarce memory resources on communications device 100, the captured image may be transmitted from communications device 100 to an Image Repository.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. The battery 130 may be used to power all components and modules in the communication device 100, including the camera module 126 and associated camera logic 128.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Various alternatives exist for the messaging application 136 as is well known to those skilled in the art. Messages that have been sent or received by the user are typically stored in local storage such as flash memory 108 of the communication device 100, or in some other suitable storage element in the communication device 100. In an alternative embodiment, some of the sent and received messages may be stored remotely from the communication device 100 such as in a data store of an associated host system that the communication device 100 communicates with. In an embodiment, the messaging application 136 may include a Message List user interface that is configured to allow a user to see a list of message objects (i.e. email messages) in a convenient list form. This will be described in detail further below.

The software applications 134 may also include a GPS map application 146 for providing geographic navigation, and location coordinates for geotagging objects. GPS map application 146 may be configured to operatively connect to GPS subsystem 124 to receive GPS latitude and longitude coordinates for a current position of the communication device 100. GPS map application 146 may also store scalable maps of various geographic regions in order to show the current position of communication device 100 on the map. As well, the GPS map application 146 may be configured to obtain latitude and longitude location coordinates by allowing a user to select a position on the GPS map.

Still referring to FIG. 1, communication device 100 may execute an Image Applications Module 148 that may be operatively integrated with camera module 126, camera logic 128, main processor 102, RAM 106, display 110 and various other modules and components to provide various image application functions for the images captured by the camera module 126. Image Applications Module may include various sub modules such as an Image Upload Module 148B, an Image Resizing Module 148C, a Message Integration Module 148D, and an Image Geotagging Module 148E. These various sub modules may interact with each other, and with other application modules such as the messaging application 136, Internet browser module 138, address book module 142, GPS map module 146, etc. in order to perform various functions. Image Applications Module 148 and its sub modules will be described in more detail further below.

The communication device 100 may further include a device state module 140, an address book 142, a Personal Information Manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystem 124.

Figure 2:
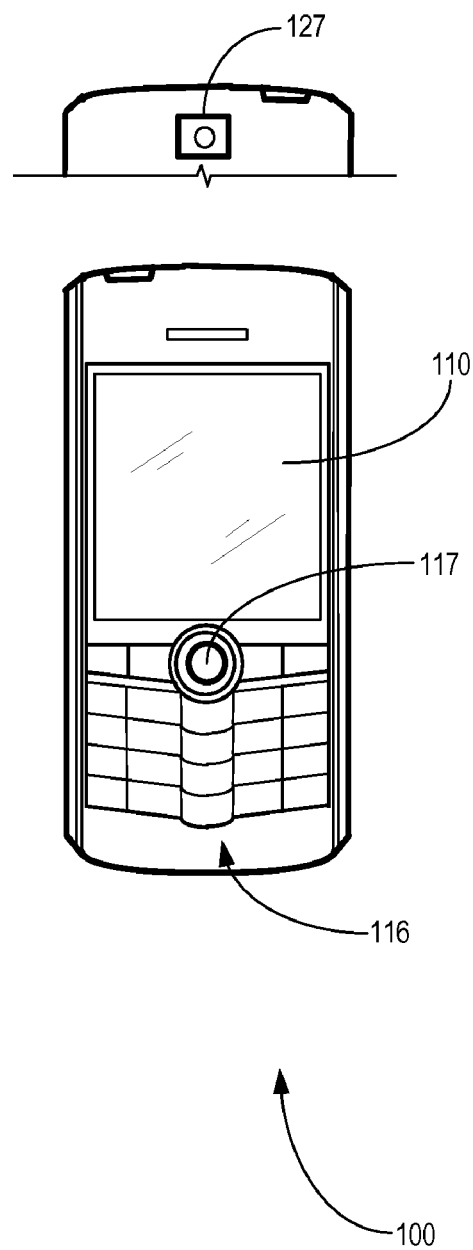
FIG. 2 is an illustrative example of a handheld mobile communication device that may provide an operating environment.

Now referring to FIG. 2, shown is an illustrative front view of a handheld mobile communication device 100 that may provide a suitable operating environment. As shown, the communication device 100 may include a display 110, a keyboard 116, and other input or navigation means such as a trackball 117. The display 110 may be configured to display various screens allowing the user of device 100 to view screen outputs from the various software applications 134, including the image applications 148. Display 110 may also be configured to provide a touch-sensitive screen input in response to a prompt or query displayed on display 110. The communication device 100 may further include a camera lens that may be used to capture an image as described above with reference to FIG. 1. In an embodiment, the integrated camera 126 may provide a camera lens 127 on the back of the communication device 100, such that a user may use the display 110 as a camera viewfinder for framing an image.

Figure 3:
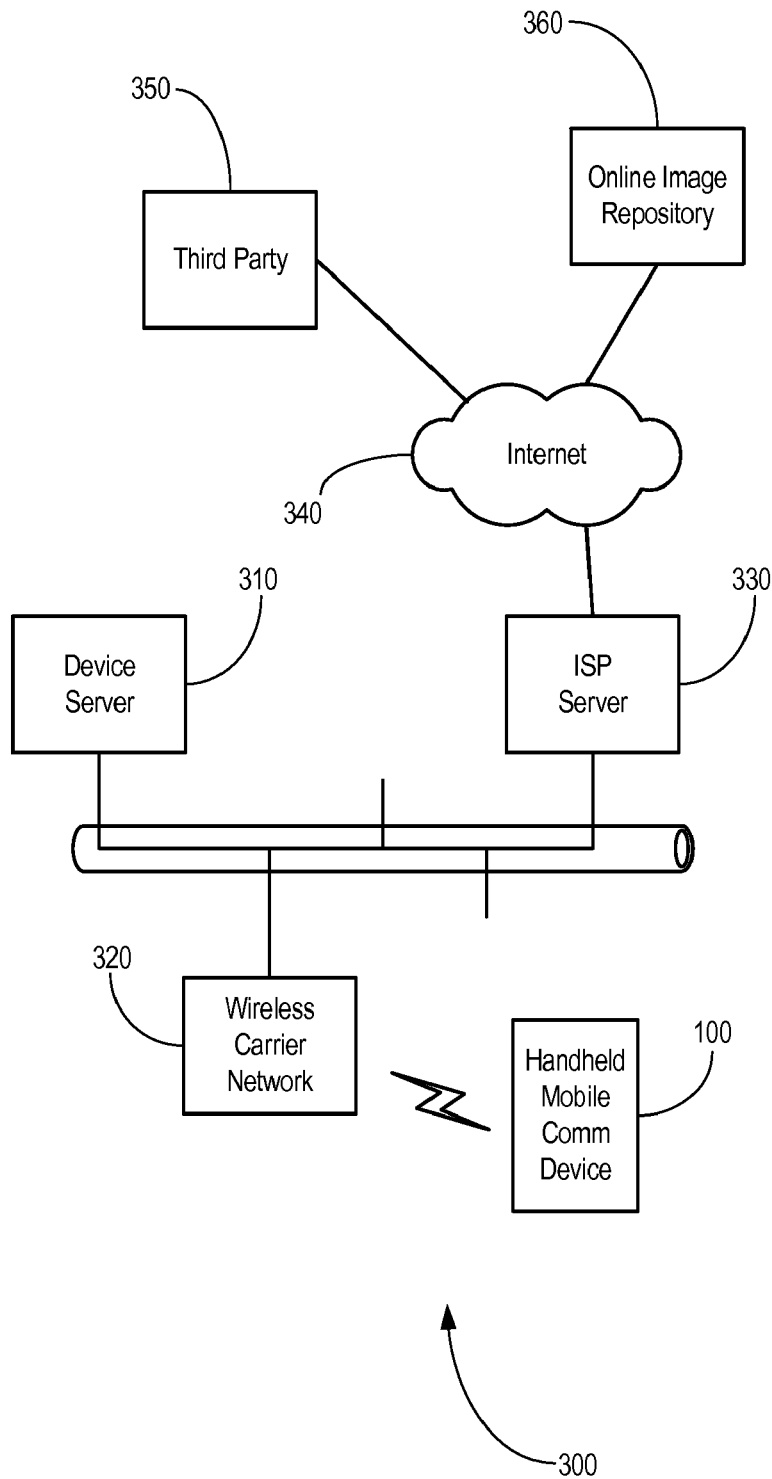
FIG. 3 is a block diagram of an illustrative example of a network environment in which various embodiments may be practiced.

Now referring to FIG. 3, shown is a schematic block diagram of an illustrative network environment 300 in which various embodiments of the invention may be practiced. As shown, network environment 300 may include a device server 310 operatively connected to the handheld mobile communication device 100 via a wireless carrier network 320. An Internet Service Provider (ISP) server 330 may also be provided in the network environment 300 such that a user of device 100 may access the Internet 340 from the device 100.

In an embodiment, the Internet 340 may provide access to an Image Repository 360. Membership to use the Image Repository 360 may be free, or may be by paid subscription, for example. The Image Repository 360 may also be accessible by a third party 350 that has membership to the Image Repository 360. As well, the Image Repository 360 may be accessed from other handheld mobile communication devices 100B within wireless carrier network 320, or from other compatible communication devices 100C with access to Internet 340.

Figure 4A:
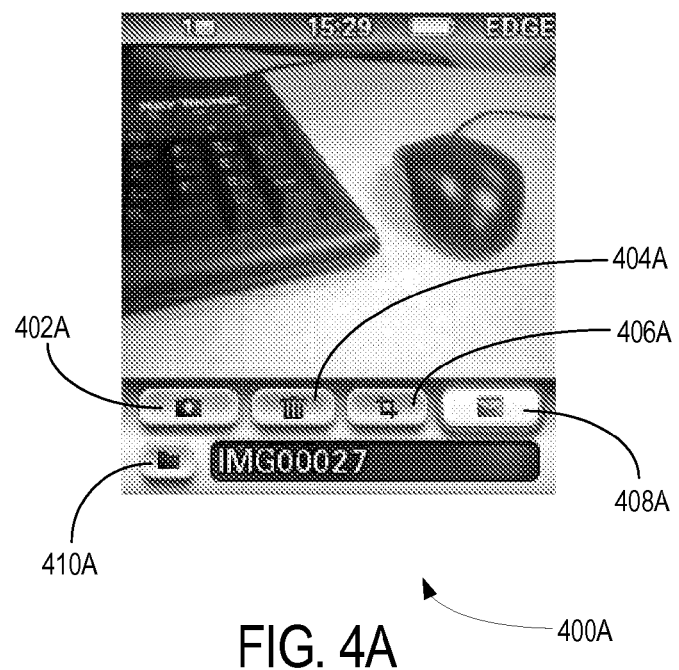
FIGS. 4A to 4H and 4J to 4L are screen captures of illustrative user interfaces in accordance with various embodiments.

Now referring to FIGS. 4A to 4L, shown are illustrative user interfaces in accordance with various embodiments. First, referring to FIG. 4A, shown is an illustrative integrated camera user interface screen 400A displaying an illustrative image "IMG00027" captured by the integrated camera (e.g. by camera module 126 and camera logic 128 as previously described). As shown, the camera user interface 400A may include icons such as a "camera mode" icon 402A, a "delete image" icon 404A, a "crop image" icon 406A, a "mail image" icon 408A, and an "images folder" icon 410A.

Figure 4B:
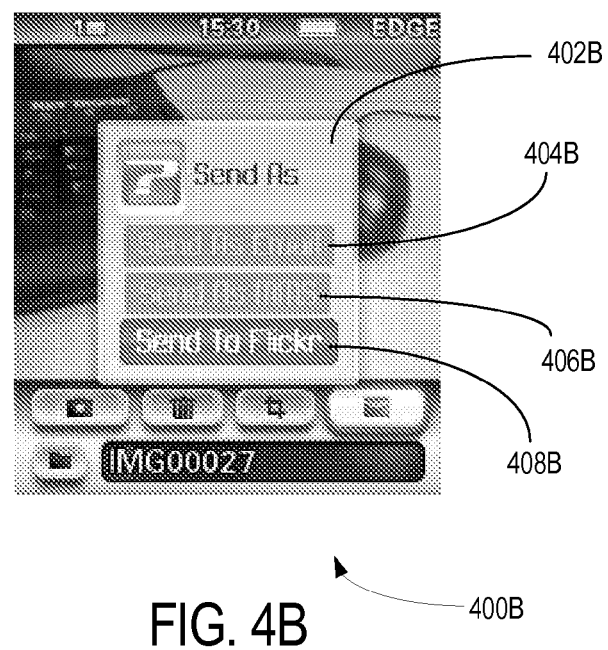

Referring to FIG. 4B, shown is a camera user interface screen 400B now including a "Send . . . " pop-up menu 402B. In this illustrative example, the "Send . . . " pop-up menu 402B includes a number of menu options including "Send as Email" 404B, "Send as MMS (Multimedia Messaging Service)" 406B, and "Send To (Image Repository)" 408B (e.g. where the Image Repository may be an online image repository such as Flickr™, for example). These "Send . . . " options will be described in more detail further below.

Figure 4C:
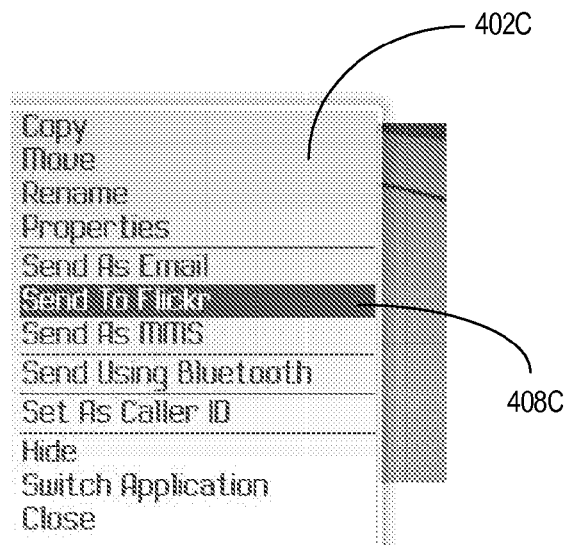

FIG. 4C shows a user interface screen 400C with a context menu 402C that may also provide the "Send . . . " menu options as described above, including "Send to (Image Repository)" 408C. This context menu 402C may be another one of several ways in which the "Send to (Image Repository)" option may be accessed, and will be discussed in more detail further below.

Figure 4D:
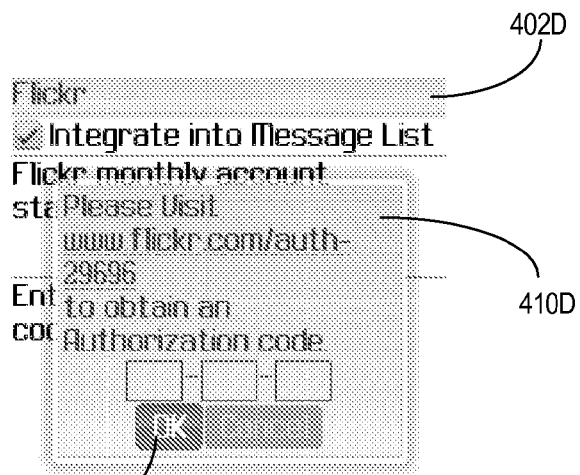

Now referring to FIG. 4D, shown is a user interface screen 400D with an option settings menu 402D for the "Send to (Image Repository)" option in which records of images uploaded to an Image Repository may be integrated into a Message List. The Message List may be a chronological listing of different types of objects that may include, for example, email messages, message status reports, telephone call records, etc. This Message List integration will be described in more detail further below.

Figure 4E:
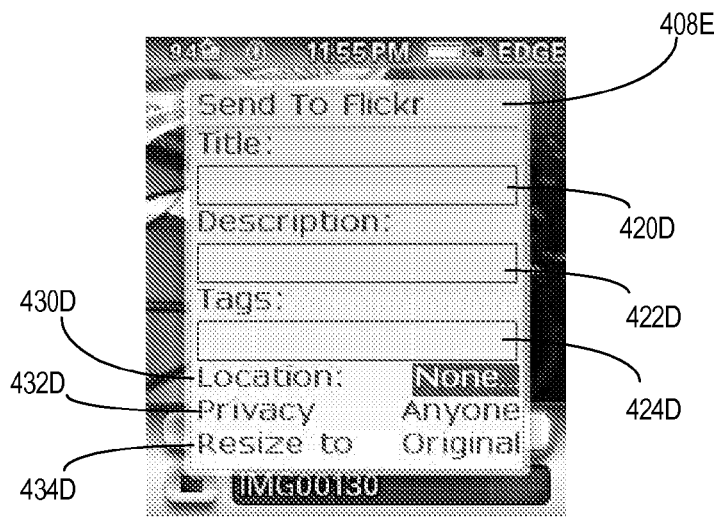

Now referring to FIG. 4E, shown is a user interface screen 400E with a "Send to (Image Repository)" window 408E in which a number of text entry fields are provided to allow the user to add descriptive information, such as "Title", "Description", and "Tags". Furthermore, the "Send to (Image Repository)" window may include various other options such as a geographic "Location" field 430D, a "Privacy" setting 432D, and an image "Resize to" setting 434D. These various settings and features will be discussed in more detail further below.

Figure 4F:
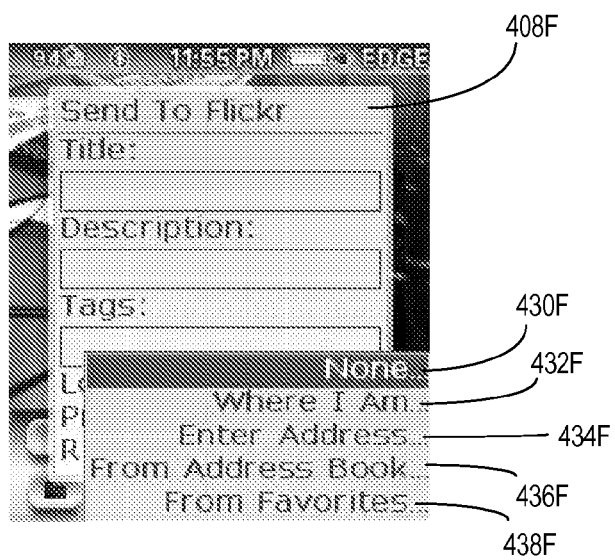

FIG. 4F shows a user interface screen 400F with an illustrative "Send to (Image Repository)" window 408F which may include various options for selecting a geographic location, such as "None" 430F, a "Where I Am . . . " option 432F, an "Enter Address . . . " option 434F, a "From Address Book . . . " option 436F, and a "Favorites" option 438F. These various options will be discussed in more detail further below.

Figure 4G:
Figure 4H:
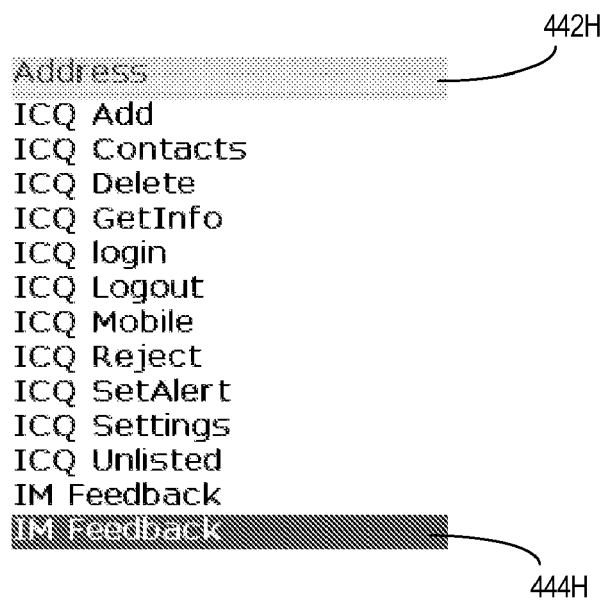

Now referring to FIG. 4G, shown is a user interface screen 400G with an illustrative "Send to (Image Repository)" screen 408G with an "Enter Address" pop-up window 440G. For example, in order to obtain geographic coordinates by address, a user may fill out one or more of the following fields: Address 442G, City 444G, State/Province 446G, and Country 448G. Alternatively, FIG. 4H shows a user interface 400H with an illustrative example of an address list 442H from which a target address 444H may be selected. With the specification of an address, or the selection of a target address from a list, the corresponding geographic coordinates may be obtained from a GPS mapping application (e.g. GPS map module 146). This feature will be described in more detail further below.

Figure 4J:
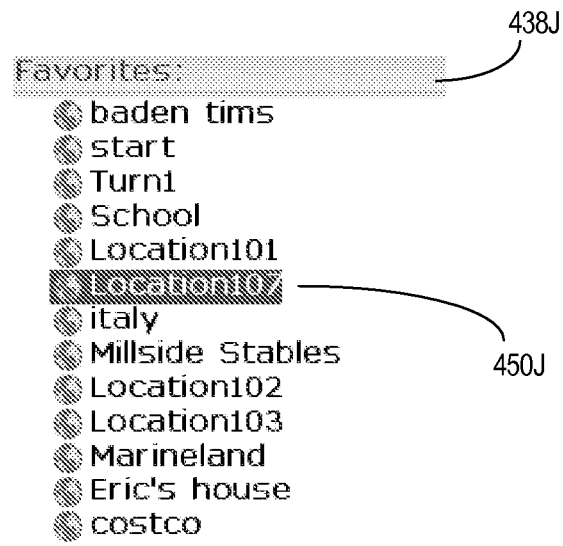

Now referring to FIG. 4J, shown is a user interface screen 400J with an illustrative list of location "Favorites" 438J from which a "favorite" location 450J may be selected for the purposes of obtaining the corresponding geographic coordinates. This feature will be described in more detail further below.

Figure 4K:
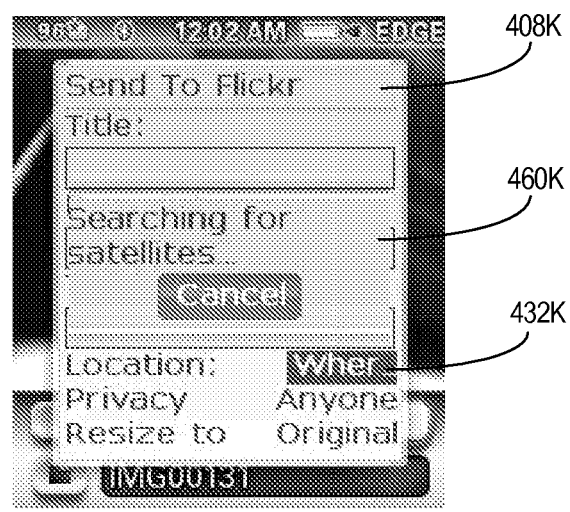

Now referring to FIG. 4K, shown is a user interface screen 400K with an illustrative "Send To (Image Repository)" screen 408K in which the "Where I Am . . . " option has been selected to obtain the geographic location. In order to determine the current location, the device 100 may search for and try to acquire GPS signals using the GPS subsystem 124, as indicated in pop-up message 460K.

Figure 4L:
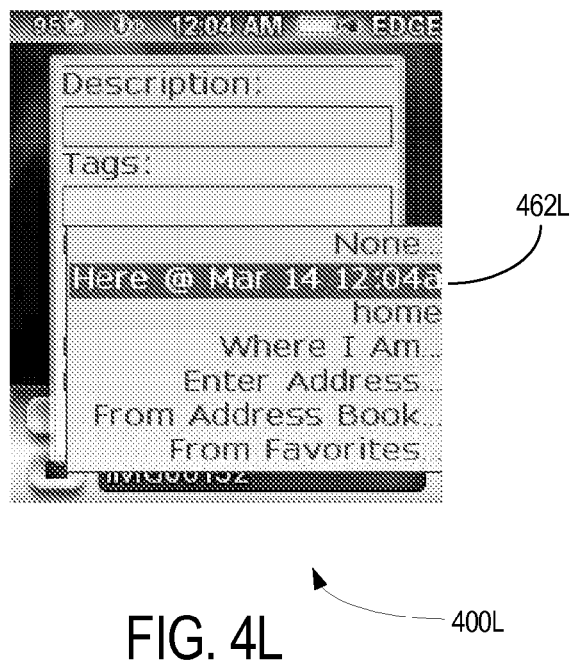

Now referring to FIG. 4L, shown is a user interface screen 400L with an illustrative geographic location menu in which a new location entry 462L (e.g. "Here @ March 14 12:04a") has been added. The use of this geographic location acquired through the "Where I Am . . . " option will be described in more detail further below.

Now referring to FIG. 5B, and referring back to FIGS. 4A to 4L as necessary, various embodiments will be described in detail.

In an embodiment, Image Applications Module 148 may include an Image Upload Module 148B configured to upload images taken by integrated camera module 126 to an Image Repository 360. The Image Upload Module 148B of photo application 148 may either be installed as communication device 100 is assembled and configured, or may be distributed as an add-on application program downloadable over a wireless carrier network 320, or by visiting a specified Uniform Resource Locator (URL) on the Internet 340 for example. As mentioned earlier, image uploading may be performed if there is limited available memory on the communication device 100, so that the user can clear the device memory as necessary in order to take more images. However, image uploading may also be done if the user wishes to easily share images with other users.

FIG. 5B is a flowchart of an illustrative method 500B for sharing images using an image upload module in accordance with an embodiment. As shown, method 500B begins, and at block 502B, awaits the capture of an image using the integrated camera module 126. Next, at decision block 504B, method 500B determines if an image has been captured. If yes, method 500B may proceed to block 506B to initiate the Image Upload Module 148B. If no, method 500B may loop back to block 502B.

In an embodiment, at block 508B, the Image Upload Module 148B may be configured to automatically display an image upload user interface upon capture of an image using the integrated camera module 126. For example, as illustrated above in FIG. 4B, the Image Upload Module 148B may display a "Send . . . " menu 402B from which a "Send To (Image Repository)" menu item 408B may be selected.

In another embodiment, the Image Upload Module 148B may also be configured to display send menu 402B with the "Send To (Image Repository)" menu item 408B preselected as the default image upload option. With this default option preselected, the user would only need to confirm the selection (e.g. with the click of a trackball 117 or a key from keyboard 116) in order to initiate the image upload process.

In an alternative embodiment, as shown in FIG. 4C, the Image Upload Module 148B may also be accessible from various other menus, such as a context menu 402C which may be made available when a user selects a predefined context menu button from a particular user interface screen. The context menu 402C may again include a "Send to (Image Repository)" option, as shown, which when selected may open another user interface screen window 408E, such as is shown in FIG. 4E.

The operation of the Image Upload Module 148B will now be described in more detail. In an embodiment, the operation of Image Upload Module 148B may enter a first "pre-authorization" state, where the Image Upload Module 148B has been downloaded and installed, but never associated with an account on an Image Repository 360. In this pre-authorization state, no image uploads have been performed, and no successful interaction has occurred with the Image Repository application programming interface (API). In this state, the user may have attempted to authorize her account, but would have been unsuccessful as there is no information or "authorization token" on the communication device 100 that is associated with the Image Repository 360. No personal information is stored in the Image Upload Module 148B at this time, and will not be until the Image Repository 360 account authorization procedure is successfully completed. Thus, at block 510B, method 500B may initiate an account authorization process to gain access to the Image Repository.

At block 510B, method 500B may configure the Image Upload Module 148B to initiate access to an account on the Image Repository 360. By way of example, there may be a number of ways in which a user may initiate an Image Repository 360 account authorization procedure: 1) the user may select a context menu option to "Send To . . . " the Image Repository 360; 2) the user may attempt to check account usage for his Image Repository account; 3) the user may click on an "Enter Authorization Key" menu option from the Image Repository 360 context menu.

In an illustrative embodiment, a user interface for account authorization provided on communication device 100 may be configured to interact with the Image Repository 360 to create an authorization token for storage on communication device 100. This authorization token stored on communication device 100 may then be used in every subsequent communication between the Image Repository and the communication device 100. As an illustrative example, if the Image Repository is Flickr, the authorization token may be used to identify which Flickr account the communication device 100 should be interacting with. The authorization token may be encrypted using a persistent content encoding function, and may be stored in this encoded form on the communication device 100.

Next, at block 512B, once a communication device 100 has a valid authorization token to upload images to the Image Repository 360, method 500B may configure the Image Upload Module 148B with the selected image upload settings. All Image Repository application programming interface (API) interactions may then be possible, and all API methods may be called.

As an illustrative example of upload settings, the Image Upload Module 148B may be configured to upload only non-protected image files of a supported image file type (e.g. GIF, JPG, JPEG, PJPEG, TIFF, PNG, RIM_PNG, BMP, WBMP). Image files may be protected, for example, if there is an enterprise IT policy not to allow uploads of images from enterprise issued communication devices 100. In the case of a protected image, the Image Upload Module 148B functionality as described herein may be largely curtailed.

As noted earlier, the Image Upload Module 148B may be initialized from a "Send To (Image Repository)" menu option located in a context menu. The context menu may be accessible from various software applications 134 to provide "Send As . . . " or "Send To . . . " menu options when the user clicks the corresponding context menu button on communication device 100. By way of example, the menu options may include "Send As Email" and "Send As SMS", and "Send To (Image Repositories)".

Next, at block 514B, method 500B may configure the Image Upload Module 148B to allow the user to specify the viewing privileges required to view any images uploaded by the user to the Image Repository 360. For example, the user may specify that the uploaded images are for the private use of the user only. Alternatively, the user may specify that the images may be shared within a defined group of users, or shared with all other Image Repository users.

In an embodiment, the Image Upload Module 148B may be available from a number of different applications, such as a camera application (for accessing and controlling the camera module 126), an image file explorer (for reviewing image files stored on communication device 100), an email attachment service (for including image files as email attachments), and possibly other software applications 134 provided on communication device 100. Thus, as will be appreciated, the Image Upload Module 148B may be associated with image files themselves, and not with any specific software application 134.

In an embodiment, the authorization token may be stored on the communication device 100 until explicitly deleted by the user. If a user has decided that he or she no longer wants the communication device 100 to be able to interact with the Image Repository 360, this may be accomplished by selecting an "Authorization Token Delete" option from a context menu, for example. Upon selecting the "Authorization Key Delete" option, the authorization key may be removed from the communication device 100, effectively disassociating the communication device 100 from the Image Repository 360 account. Further interaction with the Image Repository 360 may then be prevented without activation of a new Image Repository 360 account. If an attempt is made to activate a new account, the account authorization process described above may be initiated once again.

In an embodiment, the Image Upload Module 148B may be configured to provide users with the ability to add descriptive information to an image before uploading. The descriptive information may include a title, a caption, tag words or phrases, or other information that may be associated with the image. As an illustrative example, entering ["Snow Storm" Waterloo Cold] in a "Tag" field may result in the following tags: a) Snow Storm; b) Waterloo; c) Cold. In an embodiment, the descriptive information may be stored together with the image on local storage on the communication device 100, and may also be uploaded with the image and stored on an Image Repository 360 to be accessed by the user (or by other users with appropriate viewing privileges). The descriptive information may be optional, and if not provided by the user, need not be stored or displayed. Thus, at block 516B, method 500B may configure the Image Upload Module 148B to provide a user interface to allow a user to add descriptive information about an image to be uploaded. Method 500B may then proceed to block 518B, where upon receiving user instructions, the image may be uploaded using the selected upload settings.

In another embodiment, the user's image uploads to the Image Repository account may be recorded on the communication device 100 in a Message List, as will be discussed in detail further below. In this case, a unique identification token may be saved with each Message List object associated with the Image Repository 360, so that the unique identification token may be used in a URL linking to an image file stored in the Image Repository 360. Until the Message List object is deleted, the unique identification token may be stored with it to keep a pointer to the image stored in the Image Repository 360. Thus, at block 520B, method 500B may configure the Image Upload Module 148B to obtain a URL link to each uploaded image, thus associating the unique identification token with each uploaded image. Method 500B may then end.

Deactivating an Image Repository account may not necessarily remove the user's upload history (e.g. as recorded in a Message List). Rather, the upload history may be configured to persist in the Message List on the communication device 100, until deleted by the user. Account deactivation may also occur if a second communication device 100 is associated with the Image Repository 360 account. In this case, the first communication device 100 may automatically be deactivated.

Thus, in an aspect of the invention, there is provided a method of uploading an image file to an image repository from a mobile handheld communications device having an integrated camera, comprising: upon determining capture of an image using the integrated camera, automatically initiating an image upload module; configuring the image upload module to display an image upload user interface having user selectable image upload settings; and upon receiving user instructions, uploading the image file to the image repository with the selected image upload settings.

In an embodiment, the method further comprises preselecting default upload settings in the image upload user interface.

In another embodiment, the method further comprises initiating account authorization for the communications device to access the image repository.

In another embodiment, the method further comprises associating the image upload module only with non-protected image files of a specified image type.

In another embodiment, the method further comprises providing as one of the user selectable upload settings viewing privileges for the image file to be uploaded to the image repository.

In another embodiment, the method further comprises configuring the image upload module to provide a descriptive field in the image upload user interface for allowing a user to add descriptive information about the image file to be uploaded to the image repository.

In another embodiment, the method further comprises configuring the image upload module to obtain a URL link to the uploaded image file.

In another aspect of the invention, there is provided a system for uploading an image file to an image repository from a mobile handheld communications device having an integrated camera, comprising: means for automatically initiating an image upload module upon determining capture of an image using the integrated camera; means for configuring the image upload module to display an image upload user interface having user selectable image upload settings; and means for uploading the image file to the image repository with the selected image upload settings upon receiving user instructions.

In an embodiment, the system further comprises means for preselecting default upload settings in the image upload user interface.

In another embodiment, the system further comprises means for initiating account authorization for the communications device to access the image repository.

In another embodiment, the system further comprises means for associating the image upload module only with non-protected image files of a specified image type.

In another embodiment, the system further comprises means for providing as one of the user selectable upload settings viewing privileges for the image file to be uploaded to the image repository.

In another embodiment, the system further comprises means for configuring the image upload module to provide a descriptive field in the image upload user interface for allowing a user to add descriptive information about the image file to be uploaded to the image repository.

In another embodiment, the system further comprises means for configuring the image upload module to obtain a URL link to the uploaded image file.

In another aspect of the invention, there is provided data processor readable medium storing data processor code that when loaded onto a mobile handheld communications device adapts the device to perform the methods as described above.

While illustrative embodiments have been described above, it will be appreciated that various changes and modifications may be made. More generally, the scope of the invention is defined by the following claims.

What is claimed is:

1. A method of uploading an image file to an online image repository from a mobile communication device having an integrated camera, a device storage and a display, the method comprising:
   upon determining capture of an image as an image file using the integrated camera, displaying, on the display, a selectable option for initiating an upload of the image file to the online image repository;
   in response to receiving a selection of the option to initiate the upload of the image file, displaying, on the display, one or more selectable image upload settings;
   receiving instructions to upload the image file and, in response, uploading the image file to the online image repository with the selected image upload settings; and
   in response to uploading the image file, obtaining a link or pointer to the image file at the online image repository and storing in the device storage the link or pointer, wherein the link or pointer includes a unique identification token that is associated with the image file.

2. The method of claim 1, further comprising displaying preselected default upload settings, on the display.

3. The method of claim 1, further comprising initiating account authorization for the mobile communication device to access the online image repository.

4. The method of claim 1, further comprising: determining whether the image file is a protected image file and, if so, preventing the upload of the image file to the online image repository.

5. The method of claim 1, wherein at least one of the selectable image upload settings is a setting to specify viewing privileges for the image file to be uploaded to the online image repository.

6. The method of claim 1, further comprising displaying, on the display, a descriptive field for adding descriptive information about the image file to be uploaded to the online image repository.

7. The method of claim 1, wherein the link or pointer is a URL link to the uploaded image file.

8. A mobile communication device for uploading an image file to an online image repository, the mobile communication device comprising:
   an integrated camera;
   a display;
   a processor;
   a memory storing an image upload module, the image upload module being configured to:
      upon determining capture of the image file using the integrated camera, display, on the display, a selectable option for initiating an upload of the image file to the online image repository;
      in response to receiving a selection of the option to initiate the upload of the image file, display, on the display, one or more selectable image upload settings;

upload the image file to the online image repository with the selected image upload settings upon receiving instructions to send the image file to the online image repository; and in response to uploading the image file, obtain a link or pointer to the image file at the online image repository, and store in the memory the link or pointer, wherein the link or pointer includes a unique identification token that is associated with the image file.

9. The mobile communication device of claim 8, wherein the image upload module is further configured to preselect default upload settings.

10. The mobile communication device of claim 8, wherein the image upload module is further configured to initiate account authorization for the mobile communication device to access the online image repository.

11. The mobile communication device of claim 8, wherein the image upload module is further configured to determine whether the image file is a protected image file and, if so, prevent the upload of the image file to the online image repository.

12. The mobile communication device of claim 8, wherein at least one of the selectable image upload settings is a setting to specify viewing privileges for the image file to be uploaded to the online image repository.

13. The mobile communication device of claim 8, wherein the image upload module is further configured to display, on the display, a descriptive field for adding descriptive information about the image file to be uploaded to the online image repository.

14. The mobile communication device of claim 8, wherein the link or pointer is a URL link to the uploaded image file.

15. A non-transitory data processor readable medium storing data processor code that when loaded onto a mobile communication device adapts the mobile communication device to upload an image file captured using an integrated camera on the device to an online image repository, the data processor readable medium comprising:

code for displaying, on a display of the mobile communication device, a selectable option for initiating an upload of the image file to the online image repository upon determining capture of the image file using the integrated camera;

code for receiving a selection of the option to initiate the upload of the image file and, in response, displaying, on the display, one or more selectable image upload settings;

code for uploading the image file to the online image repository with the selected image upload settings upon receiving instructions to send the image file to the online image repository; and code for, in response to uploading the image file, obtaining a link or pointer to the image file at the online image repository and storing in a device storage the link or pointer, wherein the link or pointer includes a unique identification token that is associated with the image file.

16. The non-transitory data processor readable medium of claim 15, further comprising code for displaying, on the display, preselected default upload settings.

17. The non-transitory data processor readable medium of claim 15, further comprising code for initiating account authorization for the mobile communication device to access the online image repository.

18. The non-transitory data processor readable medium of claim 15, further comprising code for determining whether the image file is a protected image file and, if so, preventing the upload of the image file to the online image repository.

19. The non-transitory data processor readable medium of claim 15, wherein at least one of the selectable image upload settings is a setting to specify viewing privileges for the image file to be uploaded to the online image repository.

20. The non-transitory data processor readable medium of claim 15, further comprising code for displaying, on the display, a descriptive field for adding descriptive information about the image file to be uploaded to the online image repository.

\* \* \* \* \*